J. A. Cummings.

Artificial Gums & Palate.

No. 1904. Reissued Mch 21. 1865.

FRONT.

SOFFIT

SECTION

Witnesses.

S. G. Bonner

J. L. Coombs

Inventor:

John A. Cummings by

R. Rush his atty.

UNITED STATES PATENT OFFICE.

JOHN A. CUMMINGS, OF BOSTON, MASS., ASSIGNOR, BY MESNE ASSIGNMENTS, TO THE DENTAL VULCANITE COMPANY, OF SAME PLACE.

IMPROVEMENT IN ARTIFICIAL GUMS AND PALATES.

Specification forming part of Letters Patent No. 43,209, dated June 7, 1864; Reissue No. 1,904, dated January 10, 1865; Reissue No. 1,904, dated March 21, 1865.

*To all whom it may concern:*

Be it known that I, JOHN A. CUMMINGS, of Boston, in the county of Suffolk and State of Massachusetts, have invented certain new and useful Improvements in Plates for Artificial Teeth; and I do hereby declare that the following description, taken in connection with the accompanying plate of drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

The method hitherto practiced of attaching artificial teeth to a metallic plate fitting to the roof of the mouth is attended with many objections and inconveniences, as the plate, being hard and unyielding, naturally hurts the mouth, and in some degree impedes mastication and perfect articulation, while the expense of the metal employed prevents many from availing themselves of the advantage of artificial teeth.

My present invention consists in forming the plate to which the teeth or teeth and gums are attached of hard rubber or "vulcanite," so called—an elastic material possessing and retaining in use sufficient rigidity for the purpose of mastication, and at the same time being pliable enough to yield a little to the motions of the mouth.

My manner of making and using said hard-rubber plates is as follows: A wax or plaster impression of that part of the mouth which the plate is to fit is first taken, and from that impression a plaster cast is made which will exactly resemble that part of the mouth from which the first impression was taken. A plate of wax of the general form of the intended rubber plate is then made from this plaster cast, and around the front of this wax plate a vertical ridge of wax is fixed about in the position which the teeth are to occupy, in the same manner as is generally practiced in the construction of gold plates for artificial teeth. A plaster mold is then made from this wax plate, fitting it both on the upper and under side, which plaster mold is known generally as the "articulator," and is constructed so as to hold the wax plate securely and conveniently for manipulation, leaving the front edge, where the teeth are to be applied, exposed and accessible.

The figures of the accompanying plate of drawings represent my improvements.

Figure 1:
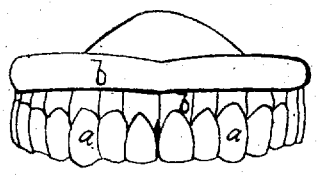
Figure 2:
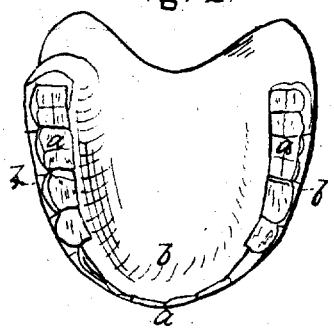
Figure 3:
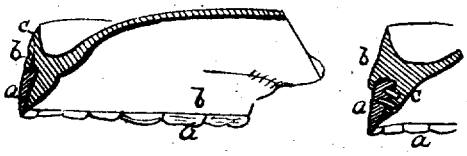

Figure 1 is a front elevation of a set of artificial teeth and plate formed by my improved method. Fig. 2 is a view of the lower side of the plate and teeth. Fig. 3 is a central vertical section of the same.

The teeth shown in the drawings are "gum-teeth," so called—that is, having porcelain gums formed in one piece with the teeth and properly colored—and they are shown each one separate; but they may be without porcelain gums, in which case the palate and gums will be formed in one piece of hard rubber, and if gum-teeth, they may be formed in groups of two or more, as desired.

My mode of operation is the same whether gum-teeth or teeth alone are used, or separate or in groups. The teeth are set in place in the wax plate and adjusted to the proper distance and fullness in same manner as is generally practiced in setting teeth in gold plates.

In the drawings the gum-teeth are made separate and marked *a a*. The wax plate and gums, with the teeth adhering thereto, are now set upon the original plaster cast of the corresponding part of the mouth, and plaster is poured all around up to about the lower edge (as it lies) of the wax plate. The margin or outlying surface of plaster is oiled or varnished, and plaster poured over the whole, forming a complete mold of the plate and teeth. Upon the opening of this mold the wax is warmed and removed, so as to leave the teeth adhering in the plaster mold in exactly the relative position they are to occupy in the hard-rubber plate. The teeth are provided with pins *c c*, projecting therefrom in such manner that the rubber which is to constitute the plate will close around them and by means of them hold or secure the teeth permanently in position. The plaster mold, with the teeth adhering therein, as just described, is now filled with soft rubber, a little at a time, pressed in with the finger, or in other convenient way, and care is to be taken that the rubber is made to completely fit into the cavities and around the protuberances, (including the pins,) and is filled in to the thickness or depth desired to form the plate. I then lock the rubber plate in position by shutting the other half of the plaster mold over it to insure its retaining its exact form while warming, and then heat or bake it in an oven, or in any other suitable way.

The soft rubber or gum so inserted in the mold is to be compounded with sulphur, rubber, &c., in the manner prescribed in the patent of Nelson Goodyear, dated May 6, A. D. 1851, for making hard rubber, and is to be subjected to sufficient heat to vulcanize or harden it, substantially as directed in that patent. It is also to be colored in imitation of the natural gums by mixing it with vermilion, or other suitable coloring-matter, while in the soft state. After the plate has been heated sufficiently to harden it or convert it into hard rubber or "vulcanite," so called, the mold is removed and the plate is polished ready for use.

Having thus described the method I have used for making and using said hard-rubber or vulcanite plates, what I claim herein, and desire to secure by Letters Patent, is—

The plate of hard rubber or vulcanite or its equivalent, for holding artificial teeth or teeth and gums, substantially as described.

JOHN A. CUMMINGS.

Witnesses:

JOSEPH GAVETT,

SAML. M. BARTON.